United States Patent
Stewart (10) Patent No.: US 10,160,886 B2
(45) Date of Patent: Dec. 25, 2018

(54) INTERLOCKING GLUE STICK

(71) Applicant: Raleigh Stewart, Fairfax, VA (US)

(72) Inventor: Raleigh Stewart, Fairfax, VA (US)

( * ) Notice: Subject to any disclaimer, the term of this patent is extended or adjusted under 35 U.S.C. 154(b) by 0 days.

(21) Appl. No.: 15/419,778

(22) Filed: Jan. 30, 2017

(65) Prior Publication Data
US 2018/0215963 A1 Aug. 2, 2018

(51) Int. Cl.
*B32B 3/06* (2006.01)
*C09J 9/00* (2006.01)

(52) U.S. Cl.
CPC ............ *C09J 9/005* (2013.01); *Y10T 428/195* (2015.01)

(58) Field of Classification Search
CPC .................................................. B05C 17/0053
USPC ............................................................ 428/60
See application file for complete search history.

(56) References Cited

U.S. PATENT DOCUMENTS 3,267,052 A * 8/1966 Brennan .................. C09J 9/005
156/73.5

* cited by examiner

*Primary Examiner* — Alexander S Thomas
(74) *Attorney, Agent, or Firm* — John L. Sotomayor (57) ABSTRACT

An interlocking glue stick is a hot-melt glue stick with non-planar features on each end of the glue stick. The non-planar features allow a second glue stick to be coupled to the end of a first glue stick before the first glue stick has been pulled into the hot-melt glue gun. Interlocking glue sticks allow the operator of a hot-melt glue gun to place two or more glue sticks into a position where they can be pulled through a hot-melt glue gun in advance of the need to reload the hot-melt glue gun. This allows the operator to use both hands for purposes of operating the hot-melt glue gun and holding materials in alignment. At least one embodiment of the interlock glue stick allows the non-planar features at each end of the glue stick to be created with a single cut of a cutting tool.

6 Claims, 10 Drawing Sheets

INTERLOCKING GLUE STICK

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The present invention relates to the field of adhesives, more specifically, a hot-melt glue stick capable of interlocking with other hot-melt glue sticks.

Hot-melt glues are a category of adhesives which melt and flow when heated. Hot-melt glues are commonly delivered in the form of glue sticks and are applied using hot-melt glue guns.

A hot-melt glue gun is a device that has a hand grip, a 'barrel', a 'trigger', a heating element, and an extruding tip. The heating element causes the extruding tip to get hot. Two temperatures are generally available for hot-melt glues and hot-melt glue guns. Low temperature glue guns operate at a temperature of approximately 120° C. (248° F.) and are useful for delicate work where higher temperatures may cause damage. High temperature glue guns operate at a temperature of approximately 190-210° C. (374-410° F.). The glues used with high-temperature guns generally form a stronger bond. The operating temperature of the hot-melt glue gun must match the melting temperature of the hot-melt glue stick. Some hot-melt glue guns are capable of operating at either high or low temperature and can therefore accept either high-temperature or low-temperature glue sticks.

The barrel of the hot-melt glue gun accepts a hot-melt glue stick inserted into an operator end of the barrel. The barrel provides a path for the hot-melt glue stick to move forward to reach the heated extruding tip. The trigger is part of a mechanism that ratchets the glue stick forward through the barrel. Each squeeze of the trigger causes a mechanism within the glue gun to drag against a side of the glue stick and pull it forward in the barrel. After repeated squeezes of the trigger, the glue stick will move forward to the point where the front of the glue stick is pressing against the inside of the heated extruding tip. In general, glue does not come out of the extruding tip unless the trigger is being squeezed at which time the glue stick is forced forward and puts pressure against the extruding tip. The high temperature of the extruding tip causes the glue stick to melt and the pressure from the trigger pushing the glue stick forward causes some glue to be extruded at the front of the hot-melt glue gun. When the trigger is released, pressure is relieved and the glue stops flowing. The hand grip provides a comfortable way for the operator to hold the glue gun, aim the extruding tip, and squeeze the trigger to apply glue.

The hot-melt glue sticks are generally cylindrical in nature and have ends with planar surfaces which are perpendicular to the side of the glue stick. The planar surface and the perpendicular orientation may allow a second glue stick to be used to push a first glue stick though the glue gun.

In use, a first glue stick is pushed into the operator end of the barrel and manually pushed forward until it contacts the ratcheting mechanism of the glue gun. At that point, repeatedly pulling the trigger will move the glue stick forward until it contacts the heated extruding tip. Further pulling of the trigger will cause hot glue to extrude from the front of the gun. At some point, the first glue stick will have moved forward so that the non-leading end of the glue stick is no longer in contact with the ratcheting mechanism and the first glue stick will not be able to move any farther forward nor will the hot-melt glue gun be able to extrude more hot glue. In this case, a second hot-melt glue stick is inserted into the operator end of the barrel and manually pushed forward until it touches the ratcheting mechanism. Then, repeatedly pulling the trigger will move the second hot-melt glue stick forward until it contacts the back end of the first glue stick. Subsequent pulling of the trigger will move the second glue stick forward, pushing the remainder of the first glue stick into the extruding tip until such time as the first glue stick has been completely consumed and the second glue stick begins to be extruded. Eventually, the second glue stick will move forward and will no longer contact the ratcheting mechanism; then a third glue stick will need to be inserted. The planar, perpendicular surface of the hot-melt glue sticks facilitate pushing of one glue stick against another without causing the glue sticks to try to push past each other.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one as or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. As used herein, the word "or" is intended to be inclusive.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases in various places throughout this specification are not necessarily all referring to the same embodiment. Furthermore, the particular features, structures, or characteristics may be combined in any suitable manner in one or more embodiments without limitation.

As used herein, the term "longitudinal axis" means the line running lengthwise through the interlocking glue stick and passing substantially through the center of the interlocking glue stick.

As used herein, the word "lateral" means in a direction perpendicular to the longitudinal axis.

As used herein, the word "side" is means the outer surfaces of the interlocking glue stick which are oriented substantially parallel to the longitudinal axis.

As used herein, the word "end" means the outer surfaces of the interlocking glue stick which are oriented substantially perpendicular to the longitudinal axis.

As used herein the words interlock", "interlocks, and "interlocking" refer to two or more objects that engage with each other by overlapping or by the fitting together of projections and recesses with sufficient contact to resist the breaking of the interlock when a force is applied along the longitudinal axis, permitting the two or more objects to remain in contact.

An interlocking glue stick may comprise a hot-melt glue stick having a first end, a second end, a longitudinal axis, and a main body. The first end may have a non-planar surface having at least one first lateral projection and at least one first lateral recess. The at least one first lateral projection and the at least one first lateral recess may form at least one first undercut. The second end may consist of a non-planar surface having at least one second lateral projection and at least one second lateral recess. The at least one second lateral projection and the at least one second lateral recess may form at least one second undercut.

Furthermore, the second end of a first glue stick and the first end of a second glue stick may form an interlock between the first glue stick and the second glue stick. When an interlock between a first glue stick and a second glue stick exists, a longitudinal force applied to the first glue stick may move the second glue stick in a longitudinal direction. An interlock between a first glue stick and a second glue stick may be formed by causing the first end of the second glue stick to slide laterally into the second end of the first glue stick such that the at least one first undercut on the second glue stick engages with the at least one second lateral projection on the first glue stick and the at least one second undercut on the first glue stick engages with the at least one first lateral projection on the second glue stick. The interlock may prevent the first glue stick from separating from the second glue stick in the longitudinal direction. The ability to interlock the glue sticks may allow the second glue stick to be coupled to and retained in place by the first glue stick when the first glue stick is already loaded into a barrel of a hot-melt glue gun, but before there is room in the barrel for the second glue stick.

In an exemplary embodiment, a third glue stick may be coupled to the second glue stick by interlocking the second end of the second glue stick with the first end of the third glue stick. A subsequent interlock may be formed by the second end of the second glue stick and the first end of the third glue stick and may allow the third glue stick to be coupled to and retained in place by the second glue stick, even if the second glue stick is wholly exterior to the barrel of the hot-melt glue gun. The progression of interlocks formed by coupling additional glue sticks may proceed without limitation and a long chain of interlocking glue sticks may be formed, where the interlock permits each interlocked glue stick to be moved toward and through the barrel of the hot-glue gun as each glue stick is moved through the barrel through interaction with the movement mechanism of the hot-glue gun.

In an exemplary embodiment, an advantage of the interlocking glue stick is that it may allow glue sticks to be "preloaded" for use in the hot-melt glue gun by interlocking several glue sticks together before the operator of the hot-melt glue gun begins using the hot-melt glue gun to glue materials together. In this exemplary embodiment, one of the operator's hands may be used to guide the hot-melt glue gun and pull a trigger while the other hand may be used to hold and align the materials that are being glued. Using the interlocking glue stick, it may never become necessary for the operator to release the material to feed another glue stick into the hot-melt glue gun while the gun is being used. Additionally, subsequent glue sticks may be appended and interlocked to a glue stick, either in the barrel of the hot-melt glue gun or prior to the entry of the glue stick into the barrel of the ho-melt glue gun, dynamically as the hot-melt glue gun is being used. This permits either the static interlock of any number of glue sticks, or a dynamic addition of glue sticks during use of the hot-melt glue gun.

In an embodiment, glue sticks may be substantially cylindrical in shape, meaning that they have a lateral cross-section that traces a circle and is thus circular in cross-section. However the interlocking glue stick is not limited to a circular cross-section of the glue stick—embodiments of the interlocking glue stick are compatible with glue sticks having non-cylindrical shapes. Non-limiting examples of other glue stick shapes that are compatible with the invention include glue sticks having the lateral cross-section of a triangle, a square, a star, and other convex and concave polygons.

In some exemplary embodiments, the non-planar surface features of both the first end and the second end the interlocking glue stick may be created with a single cut of a cutting tool. A continuous feed of glue stick material may reach a cutting station on a glue stick production line where the cutting tool may slice down to create the first end on the continuous feed of glue stick material, where the first end cut produces a first end that may have a non-planar surface having at least one first lateral projection and at least one first lateral recess. The end piece may fall or be pushed off of the continuous feed of glue stick material by the cutting tool. The continuous feed of glue stick material may then move by substantially the length of one glue stick where a second slice by the cutting tool may cut off the first glue stick, simultaneously leaving the second end on the first glue stick and leaving the first end on the continuous feed of glue stick material where the first end and the second end are mirror image lateral projection and lateral recess shapes. Following this pattern, each slice of the cutting tool may cut a new glue stick, which may fall into a collection bin. The new glue stick may have the first end cut from the previous slice of the cutting tool and the new glue stick may have the second end cut from the slice which completed the new glue stick as mirror image projections.

Figure 1:
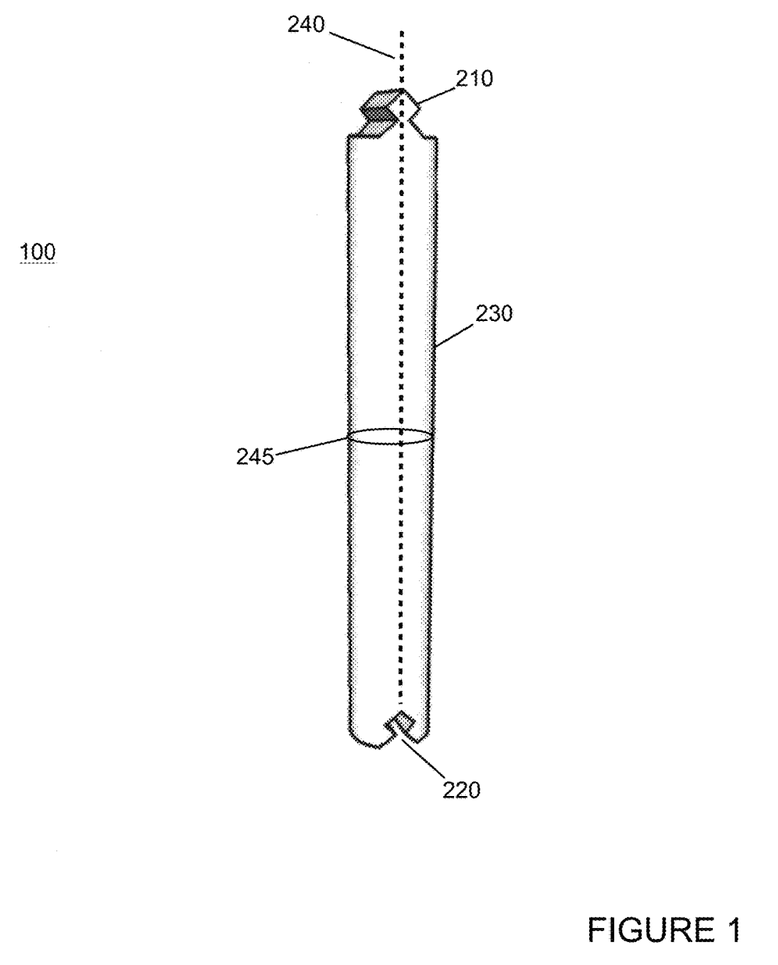
FIG. 1 is a view of an interlocking glue stick consistent with certain embodiments of the present invention.

Turning now to FIG. 1, this figure presents a view of the interlocking glue stick 100 consistent with certain embodiments of the present invention. In an exemplary embodiment, a first interlocking glue stick 100 may have a main body 230, a first end 210, a second end 220, and a longitudinal axis 240 along which the main body 230 is formed. The lateral cross-section 245 may trace a circle due to the overall cylindrical shape of the glue stick. The first end 210 may comprise a non-planar surface. The second end 220 may comprise a non-planar surface. The non-planar surface of the first end 210 is capable of being placed into contact with a non-planar surface of a second interlocking glue stick to form an interlock between the first interlocking glue stick and the second interlocking glue stick (not shown).

Figure 2:
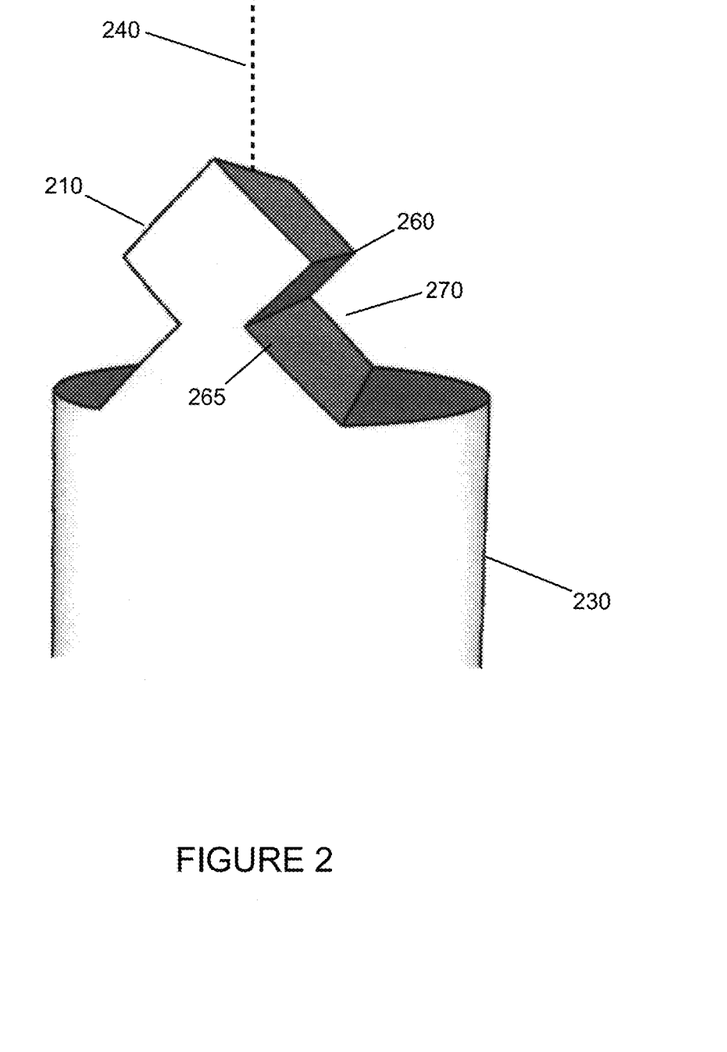
FIG. 2 is a view of the first end of an interlocking glue stick consistent with certain embodiments of the present invention.

Turning now to FIG. 2, this figure presents a view of the first end 210 of the interlocking glue stick 100 consistent with certain embodiments of the present invention. In an exemplary embodiment, the first end 210 comprises a non-planar surface having at least one first lateral projection 260 and the at least one first lateral recess 265. The at least one first lateral projection 260 and the at least one first lateral recess 265 form the at least one first undercut 270. In this non-limiting example, the first lateral projection 260 may have a diamond shape in cross section, and the first lateral recess 265 may have an angular formation that permits the diamond shape of the first lateral projection 260 to be formed. However, the first lateral projection 260 and first lateral recess 265 are not limited to this shape or cross-section, but may be formed in any shape including circular, triangular, rectangular, or any other regular polygon or shape that permits the formation of an interlock when an end of a first interlocking glue-stick is placed in contact with a similarly shaped end of a second interlocking glue-stick.

Figure 3:
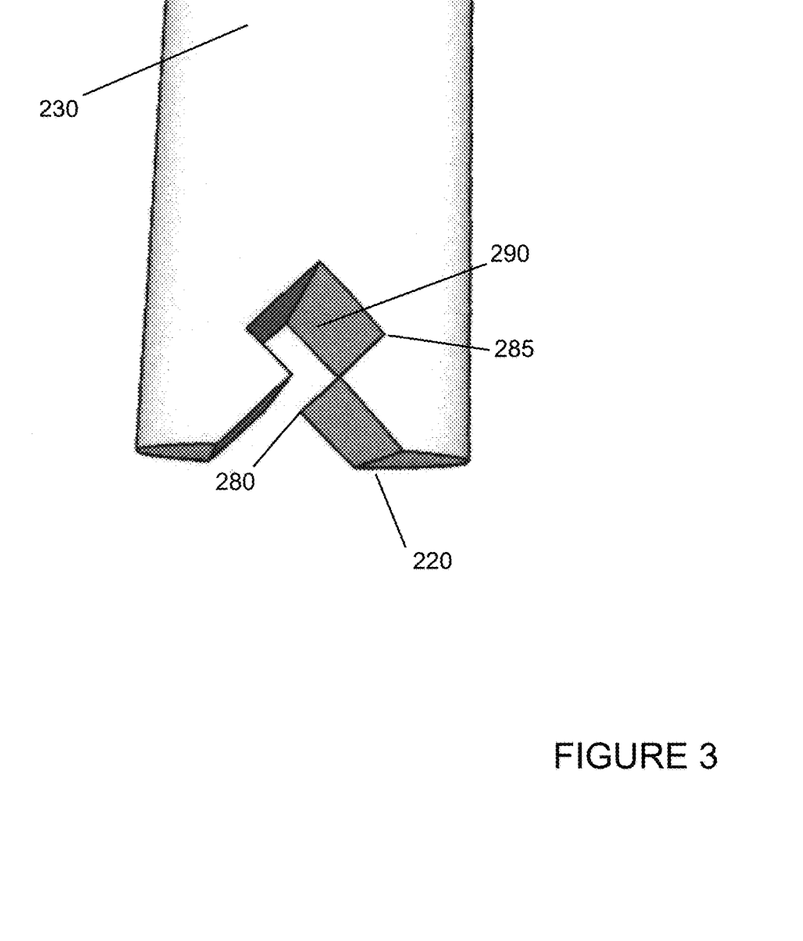
FIG. 3 is a view of the second end of an interlocking glue stick consistent with certain embodiments of the present invention.

Turning now to FIG. 3, this figure presents a view of the second end of an interlocking glue stick consistent with certain embodiments of the present invention. In an exemplary embodiment, the second end 220 comprises a non-planar surface having the at least one second lateral projection 280 and the at least one second lateral recess 285. The at least one second lateral projection 280 and the at least one second lateral recess 285 form the at least one second undercut 290.

Figure 4:
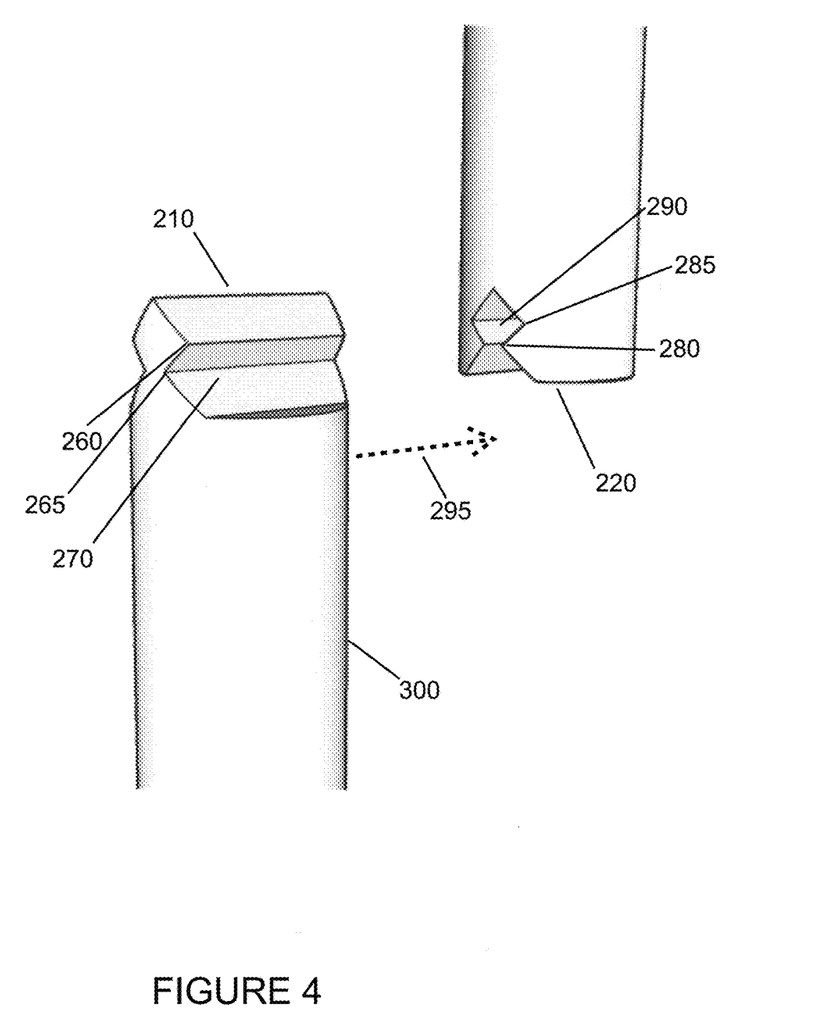
FIG. 4 is a view of two glue sticks being interlocked consistent with certain embodiments of the present invention.

Turning now to FIG. 4, this figure presents a view of two interlocking glue sticks being placed in contact so as to form an interlock consistent with certain embodiments of the present invention. In an exemplary embodiment, an interlock may be formed by causing the first end 210 of the second glue stick 300 to slide laterally 295 into the second end 220 of the first glue stick 200 such that the at least one first undercut 270 on the second glue stick 300 engages with the at least one second lateral projection 280 on the first glue stick 200 and the at least one second undercut 290 on the first glue stick 200 engages with the at least one first lateral projection 260 on the second glue stick 300. When placed in contact in this manner, the interlock is sufficiently strong to permit the second interlocking glue-stick to be pulled into and through the barrel of a hot-glue gun through the action of moving the first interlocking glue-stick through the barrel of the hot-glue gun by means of the movement mechanism of the hot-glue gun.

Figure 5:
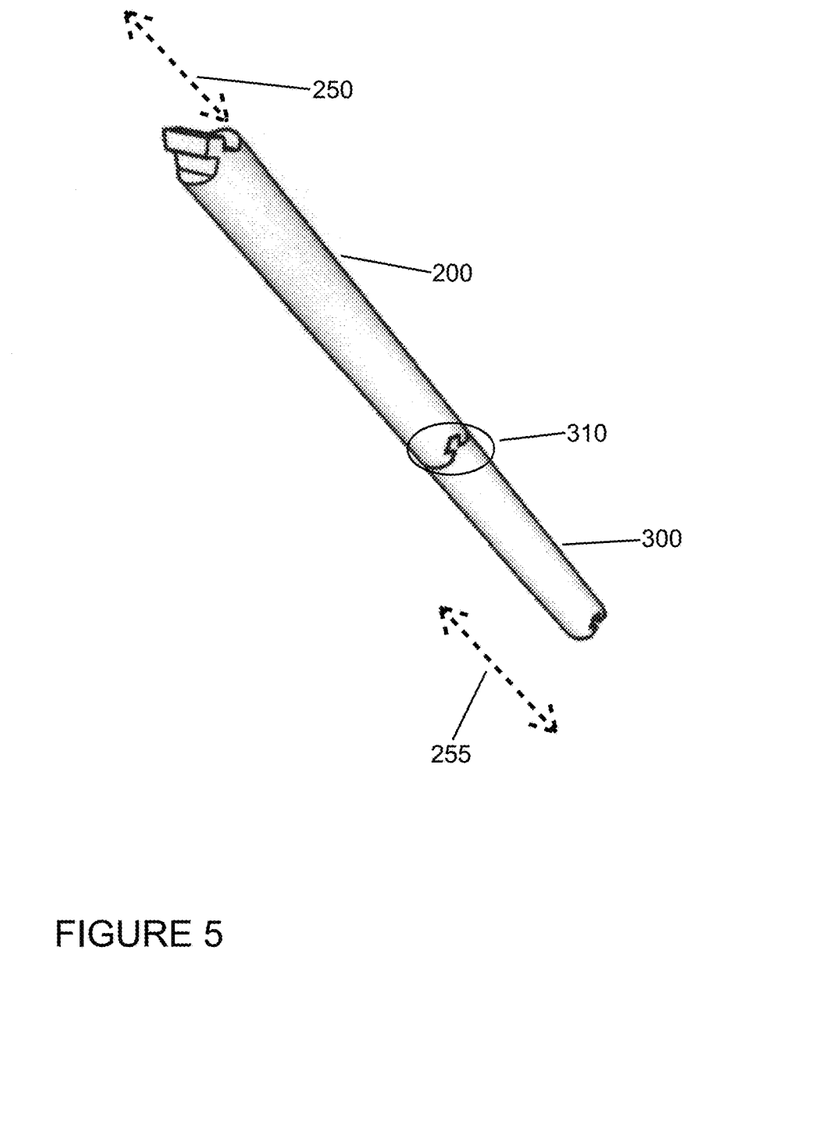
FIG. 5 illustrates two interlocked glue sticks consistent with certain embodiments of the present invention.

Turning now to FIG. 5, this figure illustrates two interlocked glue sticks consistent with certain embodiments of the present invention. In an exemplary embodiment, the first interlock 310 prevents the first glue stick 200 from separating from the second glue stick 300 in the longitudinal direction 255. In this exemplary embodiment, the strength of the first interlock 310 is such that when the first interlock 310 moves longitudinally through the barrel of the hot-glue gun the longitudinal force 250 applied to the first glue stick 200 by the movement mechanism of the hot-glue gun may move the second glue stick 300 in the longitudinal direction 255 simultaneously.

Figure 6:
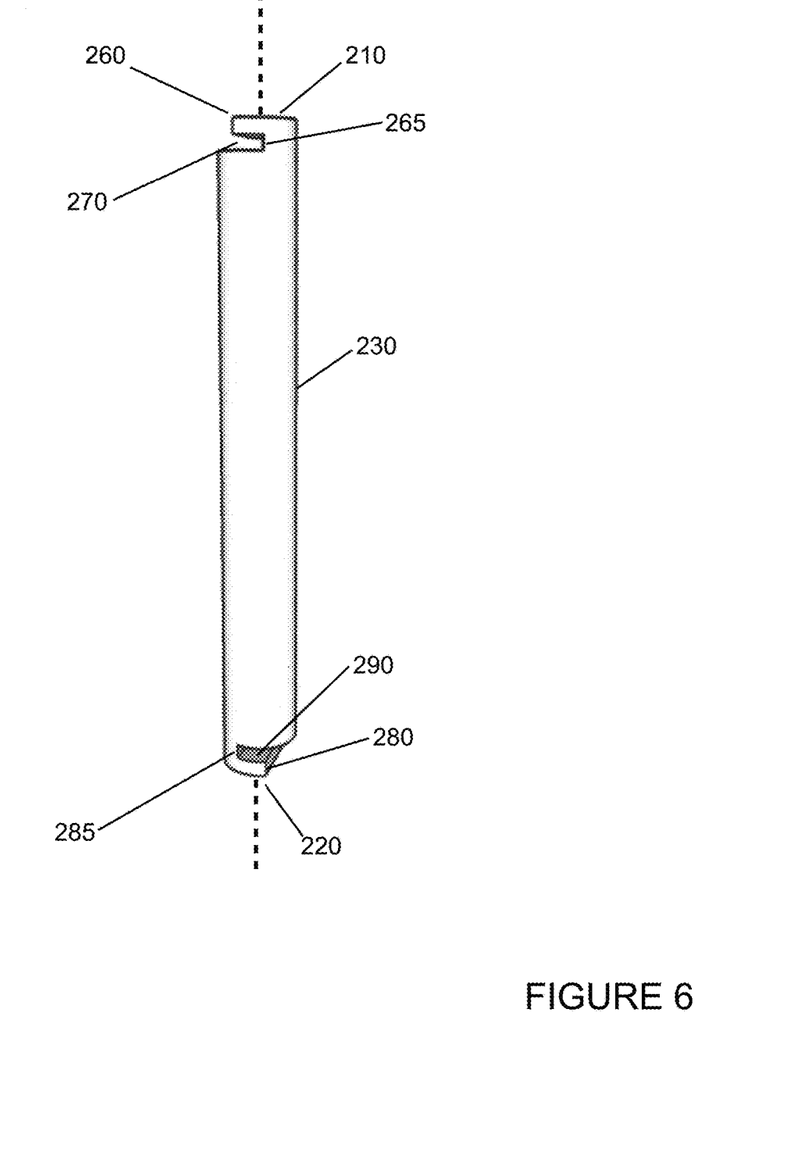
FIG. 6 is a view of an alternative embodiment of an interlocking glue stick having a single undercut consistent with certain embodiments of the present invention.

Turning now to FIG. 6, this figure is a view of an alternative embodiment of an interlocking glue stick having a single undercut consistent with certain embodiments of the present invention. In an exemplary embodiment, the interlocking glue stick has the main body 230, the first end 210, the second end 220, and the longitudinal axis 240. The first end 210 comprises a non-planar surface having the at least one first lateral projection 260, the at least one first lateral recess 265, forming the at least one first undercut 270. The second end 220 comprises a non-planar surface having the at least one second lateral projection 280, the at least one second lateral recess 285, forming the at least one second undercut 290.

Figure 7:
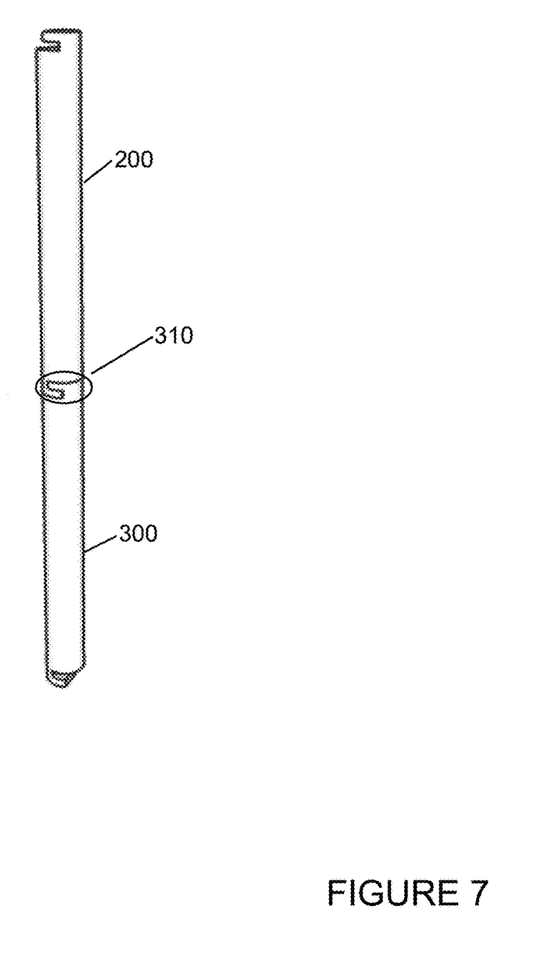
FIG. 7 illustrates two interlocked glue sticks of the type shown in FIG. 6 and consistent with certain embodiments of the present invention.

Turning now to FIG. 7, illustrates two interlocked glue sticks consistent with certain embodiments of the present invention. In this embodiment, the first glue stick 200 and the second glue stick 300, both of the FIG. 6 embodiment, are shown coupled by the first interlock 310. In this exemplary embodiment, only one undercut exists on each end of the glue stick exists, however one undercut provides a strong enough interlock connection that the interlock allows one glue stick to pull another glue stick into the hot-melt glue gun.

Figure 8A:
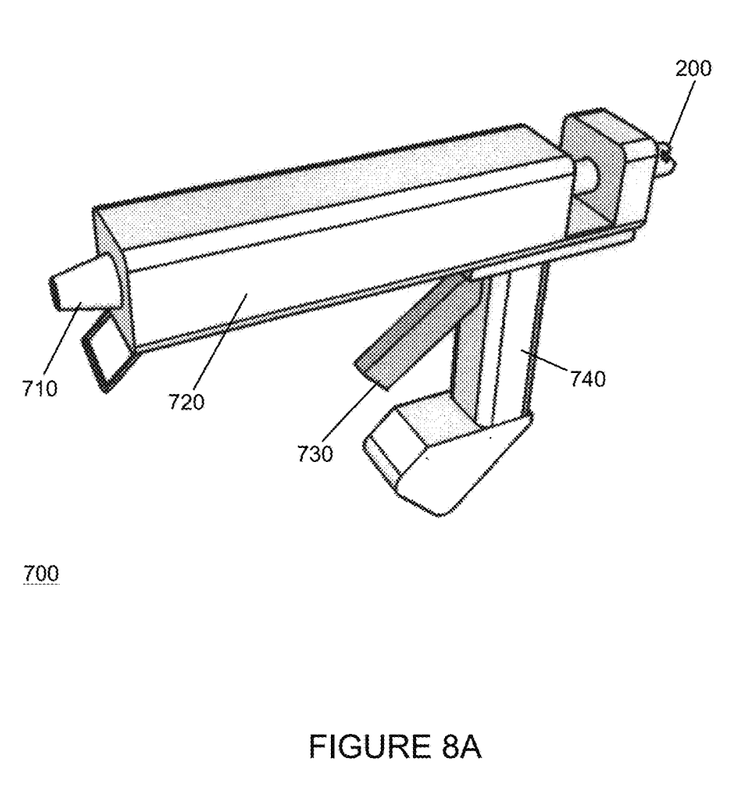
FIG. 8A is a view of a hot-melt glue gun loaded with an interlocking glue stick consistent with certain embodiments of the present invention.

Turning now to FIG. 8A, this figure is a view of a hot-melt glue gun loaded with an interlocking glue stick consistent with certain embodiments of the present invention. In this exemplary embodiment, the hot-melt glue gun 700 is shown and an extruder tip 710, the barrel 720, the trigger 730, and a hand grip 740 are identified. At the rear of the hot-melt glue gun 700, a first interlocking glue stick 200 has been inserted and ratcheted forward to a position where it is not yet touching the extruder tip 710 and the first interlocking glue stick 200 is still exposed at the rear of the hot-melt glue gun 700. If the operator is preparing to glue a large object and wants to make sure that they will not have to install more interlocking glue sticks in the middle of the gluing process, it would be desirable to add a second or perhaps even more glue sticks before starting the gluing project.

Figure 8B:
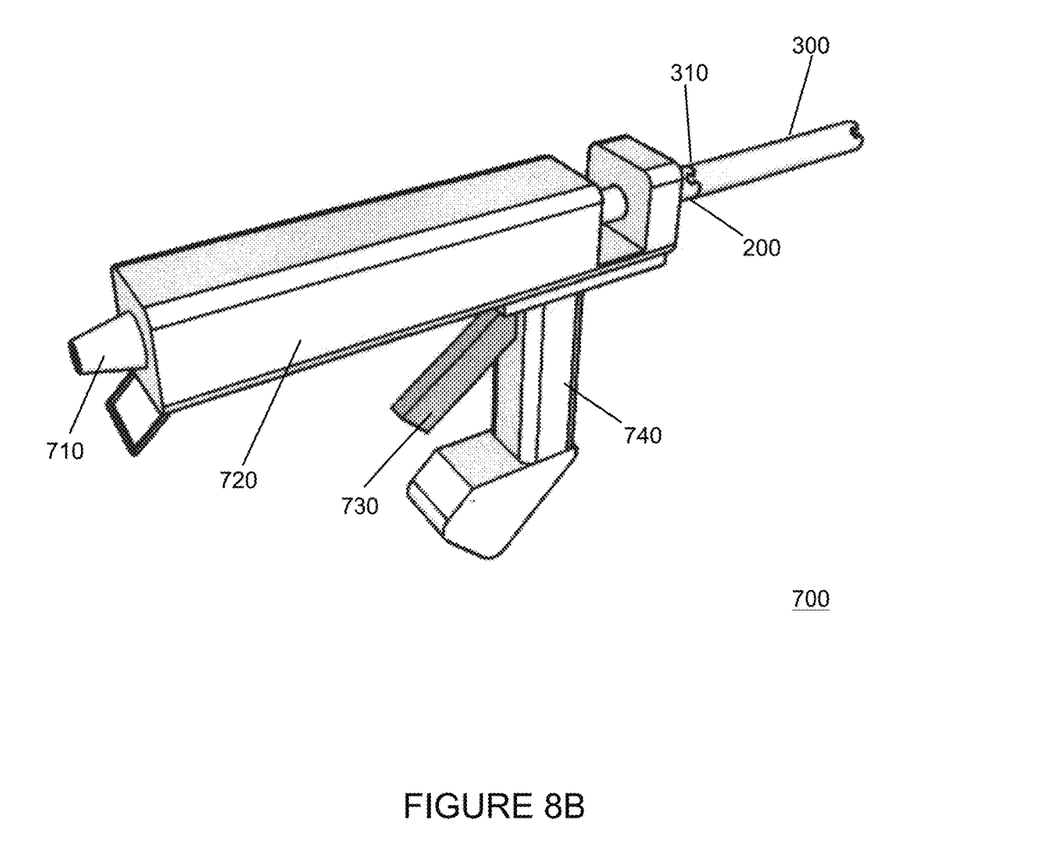
FIG. 8B is a view of a hot-melt glue gun loaded with two interlocking glue sticks consistent with certain embodiments of the present invention.

Turning now to FIG. 8B, this figure is a view of a hot-melt glue gun loaded with two interlocking glue sticks consistent with certain embodiments of the present invention. In this exemplary embodiment, an advantage of the interlocking glue sticks is apparent. Using the planar-end glue sticks known in the prior art, it would not be possible to add a second glue stick as shown in FIG. 8B, because there would be no support for the second glue stick from the hot-melt glue gun and there would be no support for the second glue stick from the first glue stick—they would simply butt end-to end using their planar end surfaces. However, by connecting the interlocking glue sticks in contact as shown in this figure, the first glue stick 200 and the second glue stick 300 may be coupled to form the first interlock 310 and then the second glue stick 300 may be retained in place by the first glue stick 200. This allows the operator to operate the hot-melt glue gun longer without having to feed more glue sticks into the hot-melt glue gun 700.

In an exemplary embodiment, as the first glue stick 200 is consumed by the hot-melt glue gun 700, it will gradually be pulled into the barrel 720 of the hot-melt glue gun 700 through the action of the ratcheting feed mechanism (not shown) of the hot-melt glue gun. The motion of the first glue stick 200 may then pull the second glue stick 300 as it moves until the second glue stick 300 is into the hot-melt glue gun 700 to a point where the second glue stick 300 may engage with the ratcheting feed mechanism (not shown) that is associated with the trigger 730. At that point the second glue stick 300 may continue moving into the hot-melt glue gun 700 without further assistance from the first glue stick 200.

Figure 8C:
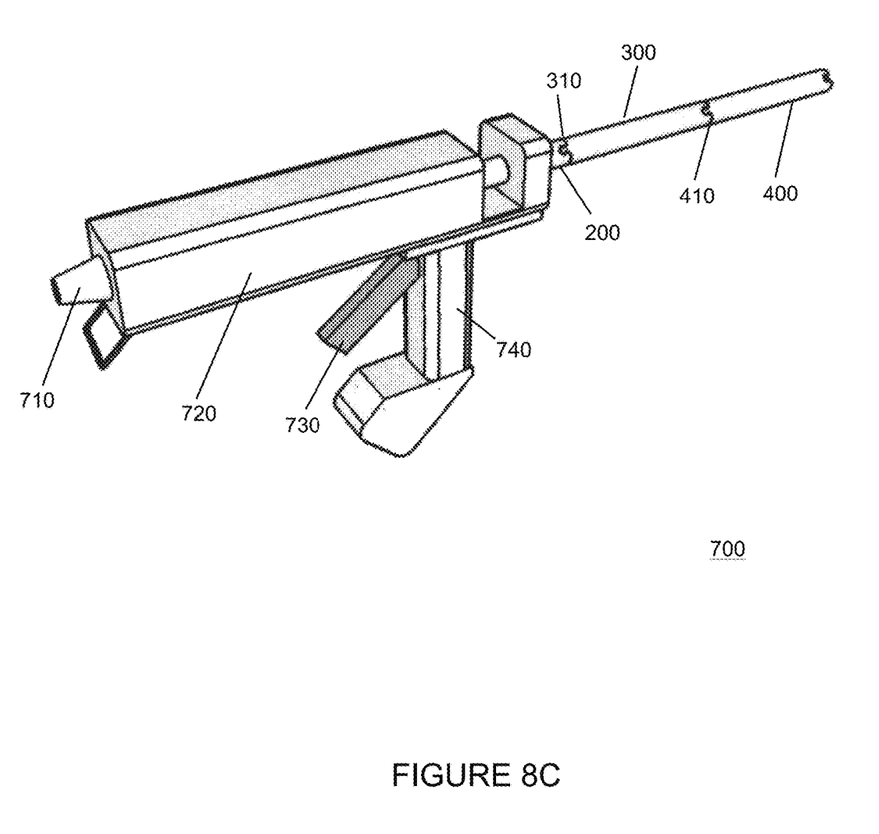
FIG. 8C is a view of a hot-melt glue gun loaded with three interlocking glue sticks consistent with certain embodiments of the present invention.

Turning now to FIG. 8C, this figure is a view of a hot-melt glue gun loaded with three interlocking glue sticks consistent with certain embodiments of the present invention. In this exemplary embodiment, the operator anticipated that two glue sticks might be insufficient for the size of the glue job to be performed. The operator has coupled the second glue stick 300 to the first glue stick 200 forming the first interlock 310 and then has coupled the third glue stick 400 to the second glue stick 300 forming the second interlock 410. Even though the second glue stick 300 and the third glue stick 400 are not supported by the hot-melt glue gun 700, they receive support from the interlocks formed with the first glue stick 200 and the second glue stick 300 respectively. The first glue stick 200 will be pulled forward into the hot-melt glue gun 700 by the ratcheting mechanism associated with the trigger 730 and it will pull the second glue stick 300 and, indirectly, the third glue stick 400 forward with it. At some point the second glue stick 300 will engage with the ratcheting mechanism associated with the trigger 730 and it will continue to pull the third glue stick 400 forward. The progression of interlocks formed by coupling additional glue sticks may proceed without limitation and a long chain of interlocking glues sticks may be formed.

While certain illustrative embodiments have been described, it is evident that many alternatives, modifications, permutations and variations will become apparent to those skilled in the art in light of the foregoing description.

I claim:

1. A glue stick, comprising:
a glue stick first end comprising a first non-planar surface;
a glue stick second end comprising a second non-planar surface;
a glue stick main body;
each non-planar surface configured to form an interlock between a first glue stick and a second glue stick when the first end of the second glue stick is slid laterally into the second end of the first glue stick.

2. The glue stick of claim 1, each end further comprising at least one lateral projection and at least one lateral recess.

3. The glue stick of claim 2, where the at least one lateral projection and the at least one lateral recess form at least one undercut.

4. The glue stick of claim 3, where contact between the second end of a first glue stick and the first end of a second glue stick comprise said interlock between the first glue stick and the second glue stick.

5. The glue stick of claim 4, where the first end of the second glue stick slides laterally into the second end of the first glue stick such that the at least one undercut on the first end of the second glue stick engages with the at least one lateral projection on the second end of the first glue stick and the at least one undercut on the second end of the first glue stick engages with the at least one lateral projection on the first end of the second glue stick.

6. The glue stick of claim 5,
where a longitudinal force applied to the first glue stick moves the second glue stick in a longitudinal direction when said first glue stick has been placed in contact with said second glue stick to form an interlock between the first glue stick and the second glue stick.

* * * * *